June 3, 1952  R. F. E. STEGEMAN  2,599,074
EYEWIRE CONSTRUCTION FOR SPECTACLE FRAMES
Filed March 10, 1951
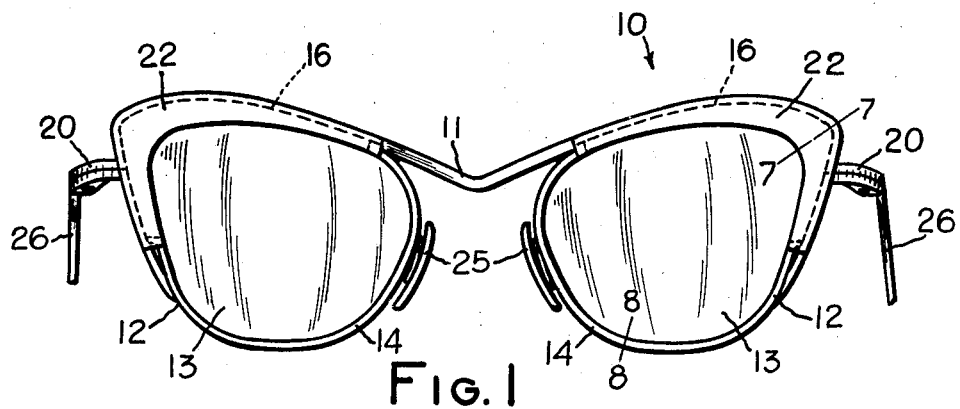
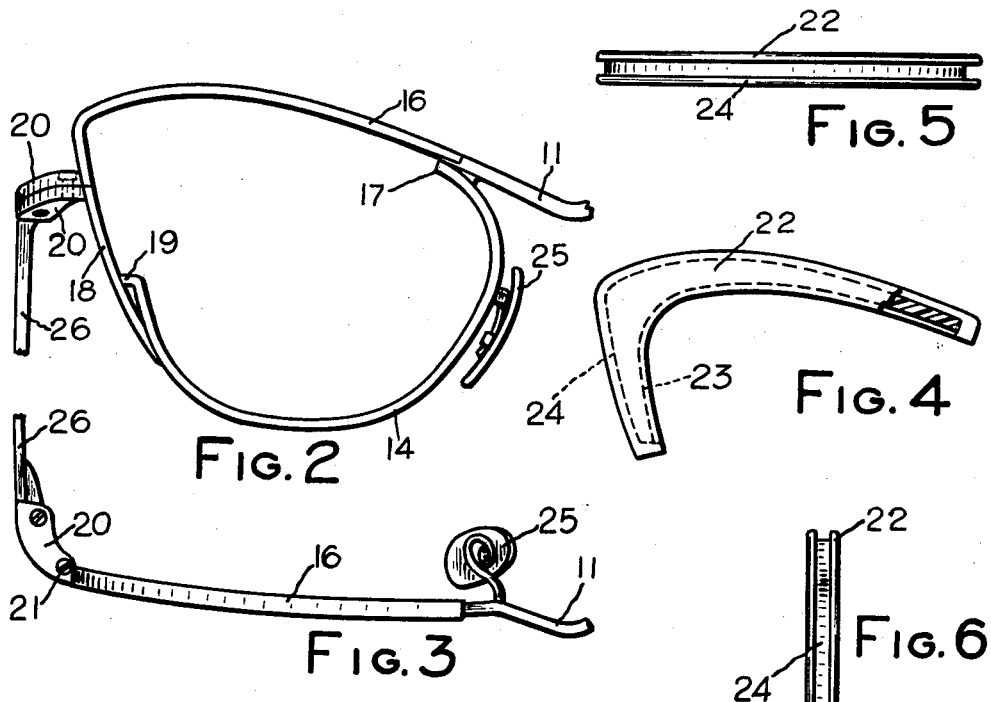
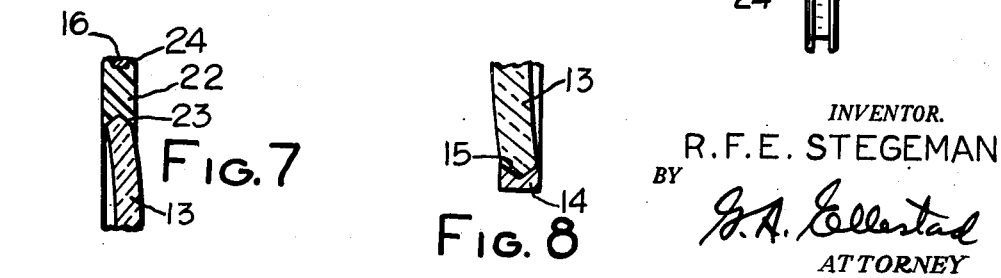
INVENTOR.
R. F. E. STEGEMAN
BY
*G. A. Ellestad*
ATTORNEY Patented June 3, 1952

2,599,074

UNITED STATES PATENT OFFICE 2,599,074

EYEWIRE CONSTRUCTION FOR SPECTACLE FRAMES

Raymond F. E. Stegeman, Greece, N. Y., assignor to Bausch & Lomb Optical Company, Rochester, N. Y., a corporation of New York Application March 10, 1951, Serial No. 214,926

4 Claims. (Cl. 88—47)

This invention relates to ophthalmic mountings and more particularly it has reference to means for holding lenses in spectacle frames embodying metallic and non-metallic parts.

One of the objects of this invention is to provide an improved spectacle frame of the type described which will be relatively simple in structure yet efficient in operation. Another object is to provide a spectacle frame having a metallic eyewire and a non-metallic member associated therewith for cushioning the lens against mechanical shock. A further object is to provide a spectacle frame of the type described having non-metallic members which are releasably held in the frame so that they may be readily interchanged to vary the cosmetic effect. These and other objects and advantages reside in certain novel feature of construction, arrangement and combination of parts as will hereinafter be more fully described and pointed out in the appended claims.

Referring to the drawing:

Fig. 1 is a front view of a spectacle frame embodying my invention, with the temples shown broken away.

Fig. 2 is an enlarged view showing the metallic eyewire construction.

Fig. 3 is a top plan view thereof.

Fig. 4 is a front view of the non-metallic member.

Fig. 5 is a top plan view thereof.

Fig. 6 is a side view thereof.

Fig. 7 is a sectional view taken on line 7—7 of Fig. 1.

Fig. 8 is a sectional view taken on line 8—8 of Fig. 1.

A preferred embodiment of my invention is disclosed in the drawing wherein 10 indicates, generally, a spectacle frame having a bridge 11 connecting the two lens holding portions 12 which are identical in construction and carry the lenses 13. Each lens holding portion has a metallic eyewire part 14 provided on its inner edge with a groove 15 for receiving the nasal, bottom and lower temporal edge portions of the lens 13. A second metallic eyewire part 16 has one of its ends soldered to the bridge 11 and in spaced relation to the adjacent end 17 of eyewire part 14 so as to provide an inwardly extending offset. Another metallic eyewire part 18 has one of its ends soldered in tangential relation to the lower temporal portion of the eyewire 14 and also soldered to the outwardly formed end 19 of eyewire 14 so as to provide another inwardly extending offset. The adjacent ends of eyewire parts 16 and 18 are soldered to lugs 20 which are releasably held together by screw 21.

A non-metallic member 22, made of any suitable material such as plastic and having a generally L-shaped form, is provided, respectively, on its inner and outer faces with the grooves 23 and 24. The member 22 is positioned with its inner groove 23 receiving the top and upper temporal edge portions of the lens 13. Thus, the nasal and bottom portions of the edge of the lens 13 are seated in the groove 15 in eyewire part 14 while the remaining portion of the edge of the lens 13 is seated in the inner groove 23 formed in the non-metallic member 22. When the member 22 is in position, its ends are, respectively, in abutting relation to the offsets formed at 17 and 19 and the eyewire parts 16 and 18 are seated in the outer groove 24 in member 22. The usual nose pads 25 are soldered to the eyewire parts 14 and temples 26 are pivotally mounted on lugs 20.

It will be apparent from the foregoing that I am able to attain the objects of my invention and provide an improved spectacle frame of the type described. The non-metallic members 22 act to cushion or absorb mechanical shocks so that lens breakage is reduced. The non-metallic members 22 may be formed of suitable materials of various colors and may carry any desired ornamentation. Since both the lens 13 and non-metallic member 22 may be readily removed by removing clamping screw 21, it is obvious that the members 22 may be interchanged so as to produce any desired cosmetic effect. By employing the offsets in the eyewire part, the member 22 is firmly held in place with the eyewire parts 16 and 18 firmly seated in the groove 24 and the lens 13 securely held in grooves 23 and 15.

Various modifications may, of course, be made without departing from the spirit of my invention as pointed out in the appended claims.

I claim:

1. In a spectacle frame, the combination of a metallic eyewire having an internal groove in which is mounted a portion of the edge of a lens, a non-metallic member having on its inner edge a groove in which is mounted the remaining portion of the edge of the lens, two inwardly extending offsets formed on the inner face of the eyewire in spaced relation to each other, the ends of said member being in abutting relation to the respective offsets, said member having a groove on its outer edge, said eyewire having parts extending towards each other beyond the offsets, said parts being positioned in the groove in the outer edge of the member, and means for detachably holding together the adjacent ends of the parts whereby the lens is removably held in the frame.

2. In a spectacle frame, the combination of a metallic eyewire having an internal groove in which are mounted the nasal, bottom and lower temporal edge portions of a lens, a non-metallic member having an internal groove in which is mounted the remaining edge portion of the lens, inwardly extending offsets on the upper nasal and lower temporal portions of the eyewire, said member having an external groove, said member having end portions abutting the respective offsets, said eyewire having parts extending toward each other and beyond the offsets and positioned in the outer groove of said member and means for detachably holding together the adjacent ends of said parts whereby the lens is removably held in the frame.

3. In a spectacle frame, the combination of a metallic eyewire means having two spaced offset portions interrupting the continuous contour of the inner face of the eyewire means, one of said offset portions being positioned at the upper nasal portion of the eyewire, the other offset portion being positioned at the lower temporal portion of the eyewire, the inner face of the lower portion of said eyewire having a lens seat extending from one offset to the other, a lens having its lower and nasal edges located in said seat, a non-metallic member extending along the temporal and upper portions of the lens between said offset portions, the inner edge of the member having a seat in which the remaining portion of the edge of the lens is positioned, the outer face of the member having a groove in which the adjacent portions of the eyewire are seated.

4. In a spectacle frame, the combination of a lens, a metallic eyewire part having a seat for a portion of the edge of said lens, said eyewire part extending downwardly from the upper nasal portion of the lens and thence to the lower temporal portion of the lens, a non-metallic member along the upper and temporal edges of the lens, the ends of said member being in abutting relation to the ends of said part, said member having on its inner face a seat for the remaining portion of the edge of the lens, and additional metallic eyewire means connecting the end portions of said part, said additional eyewire means being positioned in a groove formed in the outer face of the member and having split end portions which are releasably held together whereby the lens and member are detachably held.

RAYMOND F. E. STEGEMAN.

No references cited.